FIG. I.

INVENTORS
David H. Mooney, Jr. and
John M. Porter.

even, when the Doppler signals change of frequency differs from that of the variable frequency oscillator the frequency of the output of the mixer 16 will also vary depending upon the degree of mismatch between the Doppler frequency signal change and the variable frequency oscillator frequency change. Therefore, when a desired target is being scanned the output of the mixer 16 will be at substantially constant frequency while targets within an undesired acceleration range will cause the output of the mixer 16 to vary in frequency to provide thereby a spurious cluster of frequencies.

United States Patent Office 3,386,093
Patented May 28, 1968

3,386,093
TARGET-SENSING APPARATUS
David H. Mooney, Jr., Severna Park, Md., and John M. Porter, Annandale, Va., assignors to Westinghouse Electric Corporation, Pittsburgh, Pa., a corporation of Pennsylvania
Filed June 9, 1967, Ser. No. 644,974
8 Claims. (Cl. 343—7.7)

ABSTRACT OF THE DISCLOSURE

The present disclosure relates to target sensing apparatus for sensing a target having a selected acceleration and discriminating against targets having a non-selected acceleration. Doppler signals generated in response to the acceleration of the target are compared with reference signals which vary in frequency at a rate indicative of the acceleration of a target desired to be sensed. The compared signals are passed through a filter bank including a plurality of filters, each of the filters having a predetermined bandwidth. The filters are scanned during a first and second look-time interval, and information indicative of which filters translate signals during each of the time periods is stored. The stored information is then compared and an indication given when a predetermined relationship exists therebetween denoting that the desired target has been sensed.

Background of the invention

The present invention relates to target sensing apparatus and, more particularly, to target sensing apparatus for sensing targets having predetermined accelerations and discriminating against targets having other than the predetermined accelerations.

In order to detect a target falling within a selected range of accelerations, it is necessary that information be received from the target indicative of its acceleration, and it is also necessary that the selected target acceleration be discriminated from targets accelerating at different rates. A Doppler radar system is capable of providing information indicative of the acceleration of a target sensed. However, the Doppler information received includes information indicative of the desired acceleration range as well as information denoting targets outside of the selected acceleration range. Thus, it remains to sense targets falling within the desired acceleration range while rejecting targets which fall outside of the desired range. This becomes increasingly difficult in the presence of a large number of targets at various accelerations and more so in the presence of noise wherein the signal to noise ratio is low. It would therefore be highly advantageous if target sensing apparatus could be provided that senses the presence of a target falling within a selected acceleration range while rejecting targets not falling within this range and with sensing operation being performed automatically and relatively independent of signal strength.

Summary of the invention

Broadly, the present invention provides new and improved target sensing apparatus wherein targets falling within a selected acceleration range are detected, while those falling outside the selected range are rejected. The apparatus is operative to compare Doppler signals with reference signals whose frequency varies at a rate indicative of the selected acceleration of a target to be sensed. The compared signals are applied to a filter bank including a plurality of filters with the filters being scanned during first and second look-time intervals. Information indicative of which filters translate signals during each of the time periods is stored and then compared to provide an indication when a predetermined relationship exists therebetween which denotes that a selected target has been sensed.

Description of the preferred embodiment

Figure 1:
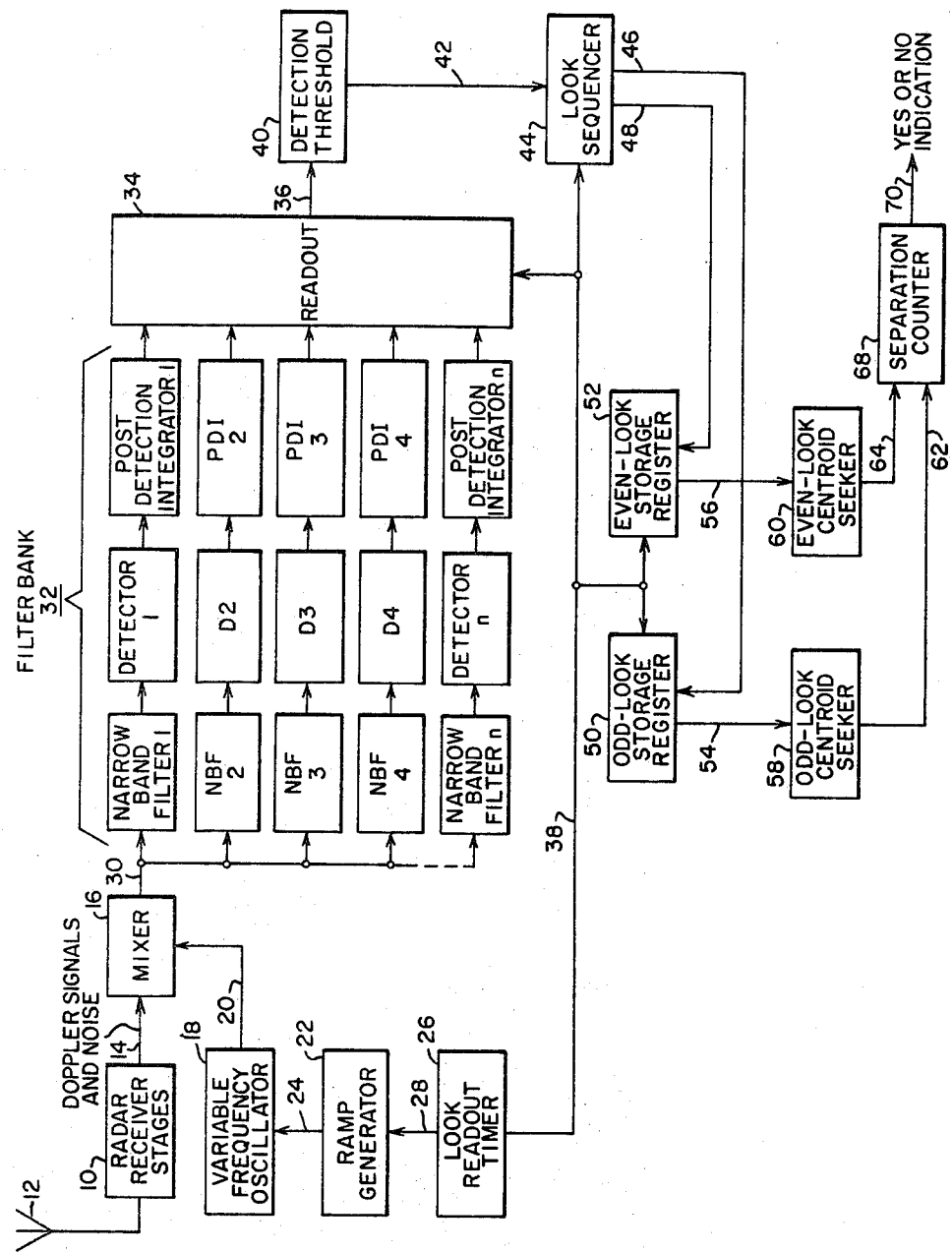
FIGURE 1 is a block diagram of the target sensing apparatus of the present invention.

Referring to FIGURE 1, the target sensing apparatus of the present invention is shown wherein Doppler signals indicative of the acceleration of a target are supplied by radar receiver stages indicated by a block 10. The radar receiver stages may comprise, for example, the input stages of a conventional Doppler radar receiver wherein transmitted signals from a radar transmitter reflected from targets having various accelerations and received by an antenna 12 of the radar receiver 10 and applied to the input thereof. The radar receiver stages 10 may include radio frequency amplifiers, mixing stages to convert the received signals to intermediate frequencies, and intermediate frequency amplifiers to supply Doppler signals at intermediate frequencies at its output 14. The Doppler signals, of course, will be in the presence of noise and will also vary in frequency according to the acceleration of the particular targets being scanned. As used herein the term acceleration will also indicate deceleration.

The Doppler signals at the output 14 are then applied to the input stage of the target sensing apparatus which comprises a mixer 16. In the mixer 16 the Doppler signals are heterodyned with reference signals from a variable frequency oscillator 18 which are applied to the mixer 16 via an output 20. The variable frequency oscillator 18 is controlled by a ramp generator 22 which supplies an input to the variable frequency oscillator via a lead 24 so as to control the rate of frequency change of the oscillator 18. The ramp generator 22 is controlled by a look-readout timer 26 which supplies an output to the ramp generator 22 via an output 28. The look-readout timer 26 and ramp generator 22 control the variable frequency oscillator 18 so that the frequency of the oscillator 18 varies over a predetermined range in a given period of time which will be called herein the look-time period.

The Doppler signals supplied to the mixer 16 vary in frequency at a rate dependent upon the acceleration of the targets being scanned. The variable frequency oscillator 18 can be designed to vary in frequency at a rate corresponding to variation in frequency of a Doppler signal indicative of a target desired to be sensed.

If the Doppler signals appearing at the output 14 and the frequency of the variable frequency oscillator 18 appearing at the output 20 vary in frequency at substantially the same rate, the sideband output of the mixer 16 at the output 30 will be at substantially constant frequency as long at this relationship is maintained. However, when the Doppler signals change of frequency differs from that of the variable frequency oscillator the frequency of the output of the mixer 16 will also vary depending upon the degree of mismatch between the Doppler frequency signal change and the variable frequency oscillator frequency change. Therefore, when a desired target is being scanned the output of the mixer 16 will be at substantially constant frequency while targets within an undesired acceleration range will cause the output of the mixer 16 to vary in frequency to provide thereby a spurious cluster of frequencies.

The output 30 of the mixer 16, which will be termed "target signals" herein, are thus generally indicative of the accelerations of the target received during that period of time. The target signals are then applied to a filter bank 32. The input of the filter bank 32 comprises a plurality of narrow band filters which are designated in FIGURE 1 as narrow band filters NBF1, NBF2, NBF3, NBF4 . . . NBF$n$. Each of these narrow band filters receives target signals from the output 30 of the mixer 16.

Figure 2:
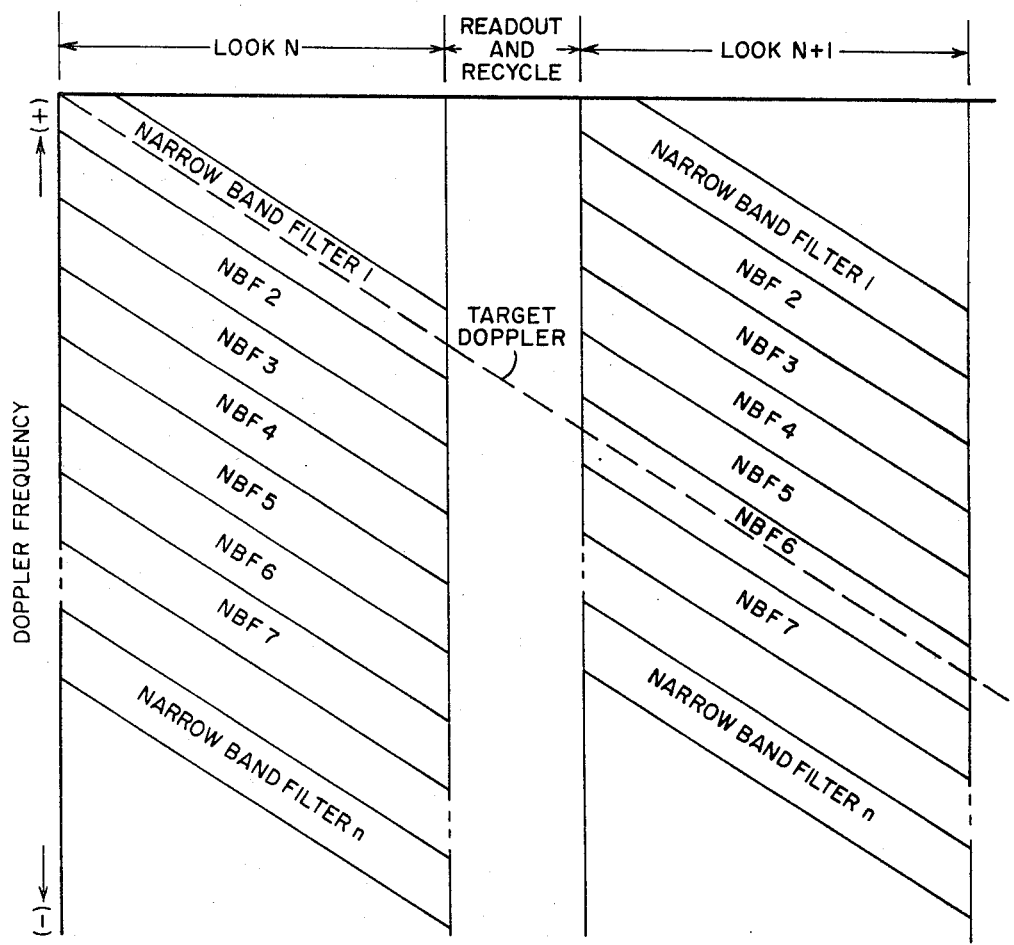
FIG. 2 is a Doppler frequency versus time plot used in explaining the operation of the present invention.

In FIGURE 2, a plot of the Doppler frequency as appears at the output 14 and applied to the mixer 16 as a function of time and also the response of the narrow band filters NBF1, NBF2, NBF3, NBF4 . . . is shown. The filters NBF1, NBF2, NBF3, NBF4 . . . are designed to have predetermined band passes and these band passes are selected so that adjacent filters have adjacent band passes. That is, the high frequency end of the band pass of NBF1 is adjacent the low end of the band pass NBF2, and similarly the high end of the band pass NBF2 is adjacent the low end of the band pass of NBF3, etc. by so selecting the band passes of the narrow band filters to be adjacent one another, the entire combination of the narrow band filters covers a predetermined bandwidth over which the expected Doppler signal frequencies should vary in typical target sensing applications.

Three time periods are of interest in FIGURE 2. These are: the first look-time period N; the second look-time period $N+1$ and a readout and recycle time period between each of the time periods.

Assume for the purpose of explanation, that the target being scanned is decelerating so that its Doppler frequency decreases in time, then the frequency of the variable frequency oscillator 18 is made also to start at a given frequency and decrease therefrom at a rate appropriate for the target desired to be detected. Thus, at the beginning of each look time period, the variable frequency oscillator 18 provides an output frequency which decreases until the end of that look. The oscillator 18 is then reset to the original frequency of oscillation at the beginning of the next look and decreases therefrom at the same rate.

Assume, also, for purposes of explanation, that a target having the desired acceleration rate to be sensed is being scanned and provides Doppler signals having the desired change of frequency rate. These Doppler signals are applied to the mixer 16. The variable frequency oscillator 18 is assumed to have an output frequency corresponding to the desired rate of change of frequency. Thus, the sideband output signals of the mixer 30 are substantially constant frequency target signals. The target signals are applied to the inputs of the narrow band filters NBF1, NBF2, NBF3, NBF4 . . . during the look N, and fall within the band pass of at least one of the narrow band filters. As shown in FIGURE 2 during the look N the target Doppler is shown to fall within the band pass of the narrow band filter 1 as indicated by the dotted line. During the look N, the Doppler frequency and the local frequency generated by the variable frequency oscillator 18 decreases substantially at the same rate, and thus the output of the mixer 30 will be substantially a constant frequency which is translated through the filter 1 substantially unattenuated. However, the other filters attenuate frequencies within the band pass of the filter 1 and, therefore, provide little or no outputs therefrom during the look N period.

During the look-time interval N the target signals translated by NBF1 are supplied to a detector D1 coupled thereto. The detector 1, for example, may comprise a conventional diode detector which converts the target signals at the frequency of the band pass of the narrow band filter 1 to unidirectional signals. Connected to the outputs of the other narrow band filters NBF2, NBF3, NBF4 . . . are detectors D2, D3, D4 . . ., respectively, which may be identical to the detector 1 and will convert alternating signals from the respective narrow band filters to unidirectional signals. The detected output from the detector 1 is applied to a post detection integrator PDI1 which integrates unidirectional output over the look-time interval N to provide an integrated output therefrom to a readout 34. Post detection integrators PDI2, PDI3, PDI4 . . . are, respectively, coupled to the outputs of the detectors D2, D3, D4 . . . and similarly perform the function of integrating the outputs applied by the respective detectors during a given look-time interval, and supply this integrated output to the readout 34 at respective inputs thereto. The post detection integrators serve the function of enhancing the signal-to-noise ratio of the input Doppler signals in the presence of noise.

The filter bank 32 thus includes a plurality of channels each channel including a narrow band filter, a detector and a post detection integrator.

Inputted into the readout 34 are thus the detected and integrated target signals indicative of which of the narrow band filters NBF1, NBF2, NBF3, NBF4 . . . translate signals thereto, which, in the present example, during the look N, is the filter NBF1. At the end of the look-time period N, a readout and recycle time period occurs when the information inputted into the readout 34 is scanned and read out from an output 36 thereof. The look and readout and recycle time intervals are controlled by look-readout timer 26 which terminates the look-time period N and begins the readout and recycle time interval as shown in FIGURE 2. The look-readout timer 26 supplies an output 38 which is applied to the readout 34 to begin its scanning readout cycle wherein the inputs to the readout 34 supplied by the respective post detection integrators PDI1, PDI2, PDI3, PDI4 . . . are in sequence translated to the output 36 thereof. The outputs of each of the integrators thus is applied sequentially via the readout channel 36 to a threshold detector 40. Whenever the output of a given filter bank channel is of sufficient amplitude, the threshold of detection threshold 40 is exceeded to provide an output 42 therefrom. As in the present example, the detection threshold of the detection threshold 40 would be exceeded when the readout 34 scans the output of the post detection integrator 1 indicative that the narrow band filter 1 has translated target signals therethrough falling within its band pass during look N. Whenever the other inputs of the readout 34 are scanned, however, no signal above the threshold level of the detection threshold 40 appears at the output 36 of the readout 34 since no signals falling within the band pass of the other narrow band filters NBF2, NBF3, NBF4 . . . are translated therethrough during the look N.

The output of the detection threshold when this threshold level is exceeded is applied to a look sequencer which is controlled by the output 38 of the look-readout timer 26. In response to the output 38 of the look-readout timer 26, the look sequencer 44 alternately applies its input 42 to an odd output 46 and an even output 48. Thus, during the odd look N, the information appearing on the lead 42 is applied through the look sequencer 44 to the odd output 46 thereof. However, during the next succeeding look N+1, information appearing on the lead 42 is applied to the even output 48. The look sequencer thus switches back and forth between odd and even outputs following odd and even look intervals N and N+1. This readout operation is accomplished during alternate readout and recycle time periods.

The odd output 46 of the look sequencer 44 is applied to an odd look storage register 50 which is activated in response to the output 38 of the look output timer 26 to be in time correspondence with the readout operation of the readout 34. Hence, during the readout and recycle interval following the look N, the look sequencer supplies an odd look storage register 50 with signals detected by the detection threshold 40 being indicative that NBF1 has translated target signals therethrough during the look N. The odd look storage register 50 stores the number information that NBF1 has translated signals of sufficient amplitude to be stored therein while the other channels of the filter bank 32 did not supply sufficient amplitude signals therethrough.

Considering now the look N+1 as shown in FIGURE 2, the Doppler frequency continues to decrease with deceleration of the scanned target; however, the variable frequency oscillator is controlled by the ramp generator 22 and the look readout timer 26 at the beginning of the look N+1 reverts to its original output frequency and then begins to decrease during the look N+1 as it did during the look N. Therefore, the output 30 of the mixer 16 will be substantially constant, however, at a lower frequency as compared to the output during the look N time interval. As can be seen in FIGURE 2, NBF6 has the proper band pass to translate target signals therethrough during the look N+1 as indicated by the target Doppler line. The filters NF1-NF5 above the band pass of the filter 6 do not translate signals therethrough as do not the filters NGF7 . . . having band passes below that of the NBF6.

Therefore, during the look N+1 the filter bank channel including NBF6, a detector D6 and a post detection integrator PDI6 will translate signals therethrough to be applied to the readout 34 at the corresponding input thereto. In response to the look-readout timer 28 the readout 34 is scanned during the readout and recycle period following the look N+1. When the readout output 36 scans the channel corresponding to the filter 6 channel, the detection threshold 40 will be exceeded to supply an output 42 therefrom. The look sequencer 44 in response to an output 38 from the look-readout timer 26 has now been switched from the even channel to translate inputs 42 supplied thereto to its even output 48 which is then applied to an even storage register 52. The even storage register 52 is controlled by the look-readout timer 38 to store information supplied thereto in time correspondence to the reading out of the readout 34, and, therefore, stores number information indicating that filter number 6 has translated target signals therethrough during the look N+1 time interval.

After the look N and the look N+1, the odd look storage register 50 has stored therein information indicative that the filter 1 translated target signals therethrough during the look N, while the even look storage register 48 has information stored therein indicative that the filter 6 translated target signals during the look N+1 time interval.

The respective output 54 and 56 of the odd look storage register 50 and even look storage register 52 are supplied to an odd look centroid seeker 58 and even look centroid seeker 60. In the present example wherein only one filter has translated target signals there through during the respective looks N and N+1, the centroid seekers 58 and 60 translate this number information therethrough to their respective outputs 62 and 64 to be applied to a separation counter 68. Thus, from the output 62 of the odd look centroid seeker 58, number 1 information indicative that NBF1 information had been stored is applied to counter 62, while from the output 64 of the even look centroid seeker 60 number 6 information indicative that filter 6 information had been stored in the even look stroage register 52 is applied thereto. The separation counter 68 is operative to respond to the difference between number information appearing at least 62 and 64. Therefore, if the separation counter is set to detect a difference of the number 5, separation counter 68 will provide a "YES" indication at its output 70, indicating that a target falling within the desired acceleration range to be detected has been sensed by the target sensing apparatus. However, if a difference exists between information supplied to the separation counter at its inputs 62 and 64 other than the preset desired difference of 5, a "NO" indication will be provided therefrom being indicative that targets falling outside of the desired acceleration range have been sensed.

The odd and even centroid seekers 58 and 60 perform the function of writing the average number output of the old and even registers 50 and 52 whenever two or more of the filter bank channels translate signals thereto of sufficient magnitude to exceed the threshold of the detection threshold 40 and be stored in the respective storage registers. Thus, for example, if during the look N both filters NBF1 and NBF2 translate traget signals therethrough of sufficient magnitude to exceed the threshold of the detection threshold 40 during the readout interval and are therefore stored in the odd look storage register 50 as the numbers 1 and 2, the odd look centroid seeker 58, in response therto, provides output information indicative of the number 1.5. Then, if during the look N+1 both filters 6 and 7 translate target signals there through which are stored in the even look register 52, the even look centroid seeker 60 would provide an output indicative of the number 6.5. With the 1.5 and 5.5 numbers being applied to the separation counter 68 a "YES" indication would be provided by the separation counter output 70 indicating that the target of interest has been sensed. As another example of this, if during the look N, filters 1, 2 and 3 translate signals which are stored in the odd look register 50, the odd look centroid seeker 58 would supply number output 2 to the separation counter 68 as the average thereof. During the look N+1 the even look centroid 69 would provide an output indicative of the average of the stored information in the even look storage register 52 and supply this to the separation counter 68.

In the above-described apparatus it can thus be seen that the discrimination between targets of interest falling within the selected acceleration ranges and those targets not of interest falling outside of the selected acceleration ranges is accomplished through a number of mechanisms. A first means of discrimination takes place through the selection of the rate of frequency rise or fall of the variable frequency oscillator 18. By the selection of the frequency rise or fall accelerating or decelerating targets may be sensed. For targets of the opposite accelerations, the heterodyning of the Doppler signals indicative of a target accelerating in the opposite sense and the variation in frequency of the variable frequency oscillator would likely be such that the output of the mixer 16 would fall outside the range of the band pass of the narrow band filters NBF1, NBF2, NBF3, NBF4 . . . Moreover, a large signal-to-noise degradation would occur in any signals supplied to the narrow band filters. If Doppler signals of the same acceleration sense as that of the variable frequency oscillator 18 are applied to the mixer, but if the Doppler signals vary at a different acceleration rate, the output of the mixer 16 will be a clutter of frequencies with an appreciable amount of signal-to-noise degradation. Thus, there is initial discrimination between targets of interest and those falling outside of the desired acceleration ranges by the matching and mismatching of the Doppler and reference frequencies. A second discrimination occurs in that the threshold of the detection threshold 40 must be exceeded during the readout operation in order for signals being translated through any of the narrow band filters NBF1, NBF2, NBF3, NBF4 . . . before any information is supplied to either the odd or even storage registers 50 or 52. Thus, those signals translated through the narrow band filters at the output of the mixer 16, even though falling within the band pass of the various filters may not be of sufficient magnitude to exceed the threshold of the detection threshold 40 to provide information to the storage registers 50 or 52. Thus, targets which have accelerations differing somewhat from the desired accelerations to be sensed, may be of insufficient amplitude to activate the detection threshold 40 and thereby discrimination is made against such targets. The alternate discrimination, however, between desired and undesired targets is made through the use of the logic elements including the storage registers 50 and 52, the centroid seekers 58 and 60 and the separation counter 68. Through the use of these logic elements, it is necessary that the proper filter number information be stored during a first look and that other filter information be stored during the succeeding look, so that, when this filter information is compared in the separation counter 68, the proper relationship exists therebetween indicating that the target of interest has been sensed. Thus, even though signals of sufficient amplitude are provided which are translated through the filter bank, exceed the threshold of the detection threshold 40 and are stored in the storage registers 50 and 52, it still remains necessary that the proper relationship exist between the stored information to activate the separation counter 68 and provide a "YES" indication.

Although the present invention hase been described with a certain degree of particularity, it should be understood that the present disclosure has been made only by way of example and that numerous changes in the details of construction and combination and arrangement of elements and components can be resorted to without departing from the spirit and scope of the present invention.

What is claimed is:

1. In target sensing apparatus for receiving Doppler signals having frequencies indicative of the acceleration target sensed, the combination of:
    reference means for comparing said Doppler signals with reference signals varying in frequency at a rate indicative of the acceleration of a target desired to be sensed and providing target signals in response to the comparison;
    a filter bank for receiving said target signals and including a plurality of filters, each having a predetermined band pass and being responsive to translate therethrough said target signals falling within its band pass;
    readout means for scanning each of said filters during a first look time period and during a second look time period and sensing which of said filters translates said target signals during said first and second look periods respectively;
    first and second storage means responsive to said readout means during said first and second look-time periods, respectively, for storing first and second information indicative of which of said filters translates said target signals during the respective look-time period; and
    indicating means responsive to said first and second information to give an indication when a predetermined relationship exists therebetween and thereby indicating that a target having said desired acceleration has been sensed.

2. The combination of claim 1 wherein:
    said reference means comprises,
    a variable frequency oscillator for supplying said reference signals, and
    a mixer circuit for mixing said Doppler signals and said reference signals to provide said target signals.

3. The combination of claim 1 wherein:
    respective filters of said plurality of filters being selected to have adjacent bandwidths and said plurality of filters being arranged to pass a predetermined band of frequencies including the frequency range of said target signals.

4. The combination of claim 3 wherein:
    said filter band including,
    a plurality of detectors, one of said detectors being associated with each of said filters for converting said target signals translated by the respective filter to unidirectional signals, and
    a plurality of integrating circuits, one of said integrating circuits being associated with each of said detectors for integrating said unidirectional signals and thereby enhancing the ability of said apparatus to sense said Doppler signals in the presence of noise.

5. The combination of claim 4 including,
    threshold detection means for receiving the respective outputs of said readout means corresponding to the integrated signals from said integrating circuits and providing an indication of which of the outputs exceeds a predetermined level.

6. The combination of claim 5 including,
    look sequencing means for setting said first and second storage means to store said first and second information during said first and second look-time periods, respectively; and
    timing means for controlling said first and second look-time periods and the readout time between look time periods.

7. The combination of claim 6 including,
    first and second centroid seeking means responsive respectively to said first and second storage means to provide said first and second information, respectively, to said indicating means which is indicative of the average number of which of said plurality of filters translates target signals therethrough.

8. The combination of claim 7 wherein:
    said first and second storage means comprise first and second storage registers, respectively, for storing said first and second information which is indicative of the respective number of said plurality of filters as arranged in said filter bank,
    said first and second centroid seeking means selecting the average number stored in said first and second storage registers, respectively, and supplying the selected number to said indicating means,
    said indicating means comprising a separation counter operative to count the separation in numbers supplied by said first and second centroid seeking means and provide an indication corresponding to the separation therebetween.

References Cited

UNITED STATES PATENTS 2,913,717  11/1959  Brandon et al. _____ 343—7.7

RODNEY D. BENNETT, *Primary Examiner.*

C. L. WHITHAM, *Assistant Examiner.*